Patented Oct. 15, 1946

2,409,437

UNITED STATES PATENT OFFICE 2,409,437

COMPOUNDING MATERIAL FOR RUBBER AND RUBBER SUBSTITUTES

Clifford G. La Crosse, Baltimore, Md.

No Drawing. Application February 21, 1945, Serial No. 579,148

6 Claims. (Cl. 196—152)

This invention relates to compounding material for use with rubber and rubber substitutes, such as GR–S, a rubbery copolymer of butadiene and styrene.

With either natural rubber or rubber substitutes it is necessary to compound with various other materials in the manufacture of rubber products. One or more of the materials added are for the purpose of imparting advantageous processing characteristics to the natural rubber or rubber substitutes referred to generically hereinafter as rubber material.

The most widely used processing materials in the manufacture of automobile tires and similar rubber products are pine tar and certain coal tar derivatives. These substances are handled as liquids in the manufacturing processes with consequent complication and inconvenience. It is one object of this invention to provide a processing material that contains pine tar and coal tar derivatives, such as have been so widely used, but in a hard resin that can be conveniently broken up or powdered for use as a solid ingredient in rubber compounding.

Another object is to provide a method for putting liquid processing materials into the form of a resin for handling as dry ingredients in rubber manufacturing.

Another object is to provide an improved processing material, that is a resin at ordinary temperatures and that contains pine tar or coal tar derivatives or both, and that also contains a petroleum pitch which includes significant amounts of a vanadium compound, more particularly vanadium pentoxide. Experience has shown that the pine tar and coal tar derivatives usually employed in the tire industry can be replaced with other bitumens in the resin of this invention, and it may be said that in its broadest aspects it is an object of the invention to provide an improved processing material that is a solid resin at room temperature, but a resin that can be broken up conveniently for dispersion through the rubber. The resin of this invention not only gives the rubber material the desired processing characteristics, but improves the physical properties of the final product to an unusual and unexpected degree.

The coal tar derivative that has been widely used for processing rubber material for use in tires is a dark colored liquid having a specific gravity 1.08–1.12 at 60° F. and a flash point of the order of 230° F. It contains a number of oily constituents of progressively increasing carbon content and molecular weight, and which become volatile at progressively increasing temperatures. A distillation test would show that the distillation begins at approximately 410° F., not over 1% of the material coming off below 410° F. A maximum of 10% of this material is volatile below 455° F. and from 30% to 60% is volatilized below 572° F.

Such material is sold under the trade name of Bardol by the Barrett Co. This material has a specific viscosity at 150° F. of 1.37 maximum and contains free carbon 0.5% maximum. Another material, apparently similar to Bardol is sold under the trade name Piccovol by the Pennsylvania Industrial Chemical Co., of Clairton, Pa.

The pine tar used as a processing material for rubber tires is a residue obtained from destructive distillation of pine wood. One such material is sold under the trade name Pigmentar by E. W. Colledge of Savannah, Ga. This material in medium grade is a golden brown liquid having a specific gravity of 1.070–1.077 at 60° F. It has a viscosity, Saybolt-Furol, of 75–110 at 122° F. Distillation starts at approximately 320° F., and the amount over at 698° F. at approximately 60%. The residue is a hard pitch. Similar medium pine tars may be obtained from other manufacturers and are standard plasticizing agents for rubber material.

The preferred embodiment of this invention combines pine tar and coal tar bitumen, such as Bardol or Piccovol, with a resin-like petroleum pitch that has a high melting point and that contains consequential amounts of a vanadium compound, particularly vanadium pentoxide. This petroleum pitch is substantially free of products volatile below 550° F., such products being driven off by boiling the pitch for a limited time. Such boiling removes all, or substantially all, of the hydrocarbons containing less than 17 atoms of carbon and having molecular weights below 240. The softening point of the petroleum pitch is 200° F. or above. It contains vanadium pentoxide as a natural ingredient in amounts in excess of 0.20%, and usually from 0.23 to .27%. The total elemental carbon present is approximately 85%, of which about 25% is fixed carbon. The hydrogen present amounts to approximately 8.5%. The molecular weight is of the order of 3200, indicating that the material is a polymer. The melting point of the material depends upon how much it is heated during manufacture, and varies from 250° F. to 400° F., but the ultimate chemical analysis of the material does not appear to be affected by the heating of the material in the course of preparation.

This petroleum pitch has a specific gravity at 77° F. at approximately 1.117. The pitch is thermoplastic and of a crystalline form that is easily pulverized. It is jet black, breaks with a conchoidal fracture and thins to a dark brown in solution. Such petroleum pitch is available under the trade name of Vanadiset from the Wilson Carbon Co., of New York.

Vanadiset has a true ash of less than one half of one percent. Examples carefully but not completely ashed down to 3.6% of a whole show an ash analysis containing vanadium 48%, silicon 28%, calcium 5%, aluminum 5%, iron 5, sodium 5%.

In making up the preferred form of the resin of this invention, the pine tar and coal tar bitumen are heated together at a temperature of not over 180° F. and the petroleum pitch is added and melts in the pine tar coal tar mixture. It is preferable to add the petroleum pitch gradually.

The heating is continued until all of the Vanadiset is melted, and the temperature can be raised during the heating process. The reason for limiting the initial temperature to 180° F. is to avoid the danger of flashing the coal tar bitumen, but the flash point is raised by the addition of the Vanadiset to the mixture and the final heating can be carried on at a temperature above 300° F., and is sometimes done with the temperature at 400° F. or higher, depending upon the melting point of the grade of Vanadiset employed. If the heating is carried on at temperatures above the flash point of the coal tar bitumen, which may be slightly higher than 210° F. before the petroleum pitch is added, a layer of live steam is kept on top of the melt to prevent combustion.

After the Vanadiset is completely melted, heating is preferably continued for ½ hr. to 1 hr. The mixture is then allowed to cool and hardens to a hard friable resin that breaks with a conchoidal fracture and that has a melting point of 160°–240° F. depending on the proportion of the ingredients used. This resin can be broken up or powdered for use with natural rubber, reclaimed, or rubber substitute, such as GR–S. It is more conveniently used as a powder when mixed on the mill, but either powder or lumps can be used in a Banbury mixer.

The proportions of the different ingredients used in the preferred embodiment of this invention are approximately 8 parts of Vanadiset to one part of pine tar and one part of coal tar bitumen, such as Bardol. These proportions can be varied, but if the amount of Vanadiset is reduced below 6 parts, the final product is soft and separate particles of the broken material tend to go together again at ordinary room temperatures. An increase in the Vanadiset to substantially more than 8 parts impairs the processing characteristics of the resin.

Since the Vanadiset used for this invention contains more than 0.20% of vanadium pentoxide, the end product obtained by reacting Vanadiset with pine tar or coal tar bitumen, or both, in the proportions indicated, gives the processing material of this invention a vanadium pentoxide content in excess of 0.15%.

The action of the Vanadiset with the tar or bitumen is not clearly understood, but indications are that some chemical reaction occurs that apparently forms a new polymer. Experiments have shown that pine tar and coal tar bitumen are not the only products that can be reacted with the Vanadiset. Another substance that has been used successfully is a saturated hydrocarbon obtained by polymerization under high heat and pressure, and sold under the trade name of Paraflux by the C. P. Hall Company, of Akron, Ohio. This material is a thick, dark liquid, that becomes thin when heated, its viscosity at 212° F. is 77 (Saybolt). Other asphalts properly thinned have been used instead of Paraflux.

The resin of this invention is an efficient plasticizer or peptizer. With some rubber substitutes, particularly GR–S, it is difficult to break down the rubber material and disperse compounding materials and fillers. The addition of a small amount of the resin of this invention, for example, approximately 5% affects the GR–S in such a way that carbon and other compounding materials are easily dispersed through the GR–S thereby reducing the milling time.

It has been found that the tensile strength of GR–S can be raised from 2450 to 3680 lbs. per square inch, and that the elongation can be increased from approximately 480% to 575% by adding the resin of this invention to GR–S compounded according to the formula shown below, the cure being 60 minutes at 287° F.

| | |
|---|---|
| GR–S | 100 |
| Carbon black | 50 |
| Zinc oxide | 5 |
| Stearic acid | 1 |
| Sulphur | 1.07 |
| Santocure | 1.02 |
| Invention resin | 5 |

These figures are given by way of illustration.

I claim as my invention:

1. A rubber compounding material comprising a friable resin made by heating together, with the ingredients in a fused condition a mixture of a petroleum pitch polymer that has a softening point above 200° F. and that contains vanadium pentoxide, in excess of 0.20%, as a natural ingredient; and a bituminous hydrocarbon mixture that is compatible with rubber and that melts below 70° F.

2. The end product obtained by fusing a quantity of petroleum pitch, that melts above 250° F. and that contains vanadium pentoxide, in excess of 0.20%, as a natural ingredient; together with a lesser quantity of a hydrocarbon mixture that has a lower melting point than the petroleum pitch and that is compatible with rubber, said end product comprising a friable resin which breaks with a conchoidal fracture and has a melting point between 160 and 240° F.

3. A rubber or rubber substitute processing material comprising the end product obtained by fusing together a petroleum pitch that has a softening point above 200° F. and that contains vanadium pentoxide in excess of 0.20%, as a natural ingredient, and a coal tar bitumen the distillation of which begins at approximately 400° F. and amounts to not over 60% at approximately 570° F., the ratio of petroleum pitch to coal tar bitumen being of the order of 4 to 1.

4. A rubber or rubber substitute processing material comprising the end product obtained by fusing together a petroleum pitch that has a softening point above 200° F. and that contains vanadium pentoxide in excess of 0.20%, as a natural ingredient, and a coal tar bitumen, said material comprising a friable resin which breaks with a conchoidal fracture and has a melting point in excess of 180° F.

5. A rubber or rubber substitute processing material comprising the end product obtained by fusing together a petroleum pitch that has a softening point above 200° F. and that contains vanadium pentoxide in excess of 0.20%, as a natural ingredient, and asphalt, said material comprising a friable resin which breaks with a conchoidal fracture and has a melting point in excess of 180° F.

6. A rubber compounding material comprising a friable resin having a melting point above 160° F. and comprising the end product obtained by heating together a fused bituminous hydrocarbon mixture, that is compatible with rubber and that melts below 70° F., with a fused petroleum pitch polymer having a softening point above 200° F. and containing vanadium pentoxide in excess of 0.20%, as a natural ingredient, and having a total elemental carbon content of approximately 85%, of which about 25% is fixed carbon, and having hydrogen in an amount of the order of 8.5%.

CLIFFORD G. LA CROSSE.